United States Patent [19]

Inamura et al.

[11] 4,235,649
[45] Nov. 25, 1980

[54] FLUX FOR BRAZING

[75] Inventors: Minoru Inamura; Noboru Takeuchi; Kazuhiro Inukai, all of Amagasaki, Japan

[73] Assignee: Mitsubishi Denki Kabushiki Kaisha, Tokyo, Japan

[21] Appl. No.: 57,071

[22] Filed: Jul. 12, 1979

[51] Int. Cl.$^3$ .............................................. B23K 35/34
[52] U.S. Cl. ........................................ 148/24; 75/27
[58] Field of Search .................................. 148/24–26; 75/27

[56] References Cited

U.S. PATENT DOCUMENTS

| | | | |
|---|---|---|---|
| 4,017,339 | 4/1977 | Okuda | 148/26 |
| 4,066,478 | 1/1978 | DeHaeck | 148/26 |
| 4,070,192 | 1/1978 | Arbib | 148/26 |

OTHER PUBLICATIONS

Okamoto et al., "Studies on Brazability of Electric Contact Chip Materials" Transactions of JWRI, vol. 6, No. 2, pp. 99–105 (1977).
Okamoto et al., "Studies on Flux Action of Silver Brazing (Report I)—Metallic Chlorides—", Transactions of JWRI, vol. 4, No. 2, pp. 119–126 (1975).

Primary Examiner—P. D. Rosenberg
Attorney, Agent, or Firm—Oblon, Fisher, Spivak, McClelland & Maier

[57] ABSTRACT

A fluoride flux for silver brazing comprises an iron powder, a cobalt powder, a nickel powder or a copper powder which has an average diameter of 1–100$\mu$ in a flux having a main component such as an alkali metal fluoride, an alkali fluoroborate, an alkali metal chloride, an alkali metal borate, etc..

5 Claims, 2 Drawing Figures

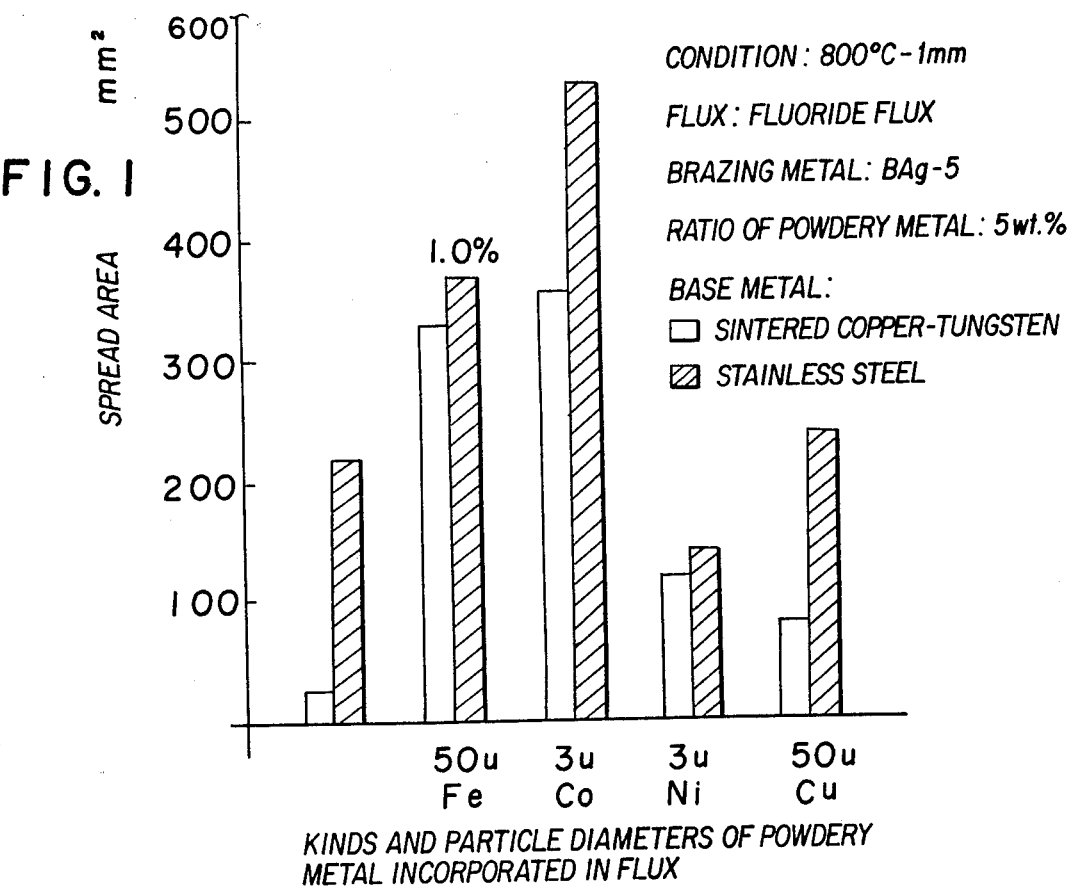
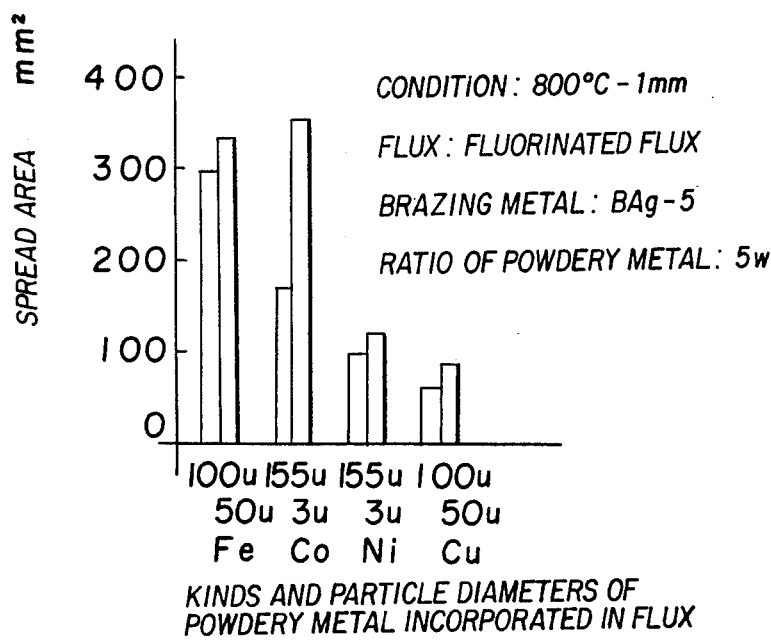

FLUX FOR BRAZING

BACKGROUND OF THE INVENTION

1. Field of the Ivention

The present invention relates to a flux for brazing especially silver brazing which is used for brazing a difficulty brazable metal such as sintered tungsten alloys or stainless steels.

2. Description of the Prior Arts

It has been well known that a tungsten or chromium component is oxidized to form its refractory metal oxide film having high melting point on a surface of the metal substrate during the heating in the silver brazing for the metal substrate such as sintered tungsten alloys or stainless steels, whereby its silver brazability is remarkably inferior. It has been proposed to improve the brazability by a brazing in a reducing atmosphere or a surface coating in a pretreatment.

In such cases, there are disadvantages that serious labour works are required for dew point control for the brazing in the reducing atmosphere improvement of reliability in the pretreatment and quality control in the brazing, however the characteristic of the resulting brazed part is not satisfactory.

SUMMARY OF THE INVENTION

It is an object of the present invention to provide a flux for braze welding especially silver brazing to braze a difficulty brazable metal.

The foregoing and other objects of the present invention have been attained by incorporating powdery metal into a flux for brazing especially silver brazing.

DETAILED DESCRIPTION OF THE PREFERRED EMBODIMENTS

The brazing metals (brazing filler metals) used in the present invention can be metals or alloys which have a melting point being lower than that of a base metal of a brazed substrate such as tungsten alloy substrates and stainless steel substrates, preferably non-ferrous metals, such as copper zinc, nickel, silver and its alloys such as copper-zinc alloy and silver alloys, especially silver alloys.

The silver brazing metals are preferably as follows.

|  | Chemical composition (wt.%) | | | |
| --- | --- | --- | --- | --- |
|  | Ag | Cu | Zn | Ni |
| BAg-5 | 45 | 30 | 25 | — |
| BAg-4 | 40 | 30 | 28 | 2.0 |
| Silvaloy 254 | 40 | 30 | 25 | 5.0 |

The fluxes can be suitable fluxes especially fluoride system fluxes.

The flux is usually prepared in a form of a paste by blending flux compounds with water, if necessary with a viscosity improver such as starch, gelatin, water glass and other macromolecular compound.

The flux compounds usually comprise a main component such as boric acid, borax, alkali metal fluorides, alkali metal borofluoride and alkali metal chloride such as $B_2O_3$, $Na_2B_2O_7$, NaF, KF, LiF, $KBF_4$, $NaBF_4$, $LiBF_4$, KCl, NaCl, LiCl etc. It is preferable to incorporate an improver such as $NiCl$, $CoCl$, $FeCl_3$, $CuCl_2$, $CuCl$, $SnCl_2$, $PdCl_2$, AgCl, etc.

In the flux, the main component is usually incorporating in a range of 30 to 95 wt. %, and water is incorporated to form suitable paste. It is especially preferable to use a fluoride flux which comprises an alkali metal fluoride, an alkali metal borate, an alkali metal fluoroborate as the main component if necessary together with an alkali metal chloride or an alkali metal borate.

The brazing metals and fluxes are illustrated in "Studies on brazability of electric contact chip materials" Transactions of JWRI Vol. 6, No. 2, 1977 and "Studies on flux action of silver brazing" Transactions of JWRI Vol. 4, No. 2, 1975. These references are incorporated in this specification.

A ratio of the powdery metal to the total flux is usually ranging from 0.5 to 10 wt. %. The powdery metal is preferably incorporated into the fluoride flux having a main component of an alkali metal fluoride or an alkali metal fluoroborate such as $KF \cdot 2H_2O$ and $KBF_4$.

A particle diameter of the powdery metal is usually ranging from 0.1 to 500μ, preferably 0.5 to 200μ especially 1 to 50μ.

In general, a dried powder is immersed into a liquid, heat of wetting results even though no dissolution nor chemical reaction is caused. This is called as Pouillet effect.

The heat of wetting ΔQi in the Pouillet effect can be shown as $$\Delta Q_1 = A - T(\partial A/\partial T)p$$

wherein A (wetting) can be given as $A = \gamma s - \gamma i$; $\gamma s$: surface tension; $\gamma i$: interface tension between solid and liquid.

The flux for silver brazing of the present invention is to improve melt wetting and fluidity of a molten metal in the brazing.

Therefore, even though A (wetting) is small, it is possible to attain suitable brazing by increasing a total heat of wetting. When the powdery metal is incorporated in the flux, the total heat is increased by wetting the powdery metals with the molten brazing such as silver brazing whereby the brazability on the difficulty brazable metal can be improved.

FIG. 1 is a graph showing results of brazability of spreading tests on the effects of incorporation of the powdery metal in the flux.

In FIG. 1, spread area of each flux containing each powdery metal on a sintered copper-tungsten alloy or a stainless steel (SUS 304) is shown in the classification of kinds of the powdery metals.

As it is clearly understood by the test results, it is confirmed that the spread area of the fluoride type flux is increased by the incorporation of the powdery metal. When a powdery metal having higher affinity to the brazing component (high solubility) is used, the wettability is remarkably improved.

In FIG. 1, an iron powder having an average diameter of 50μ; a cobalt powder having an average diameter of 3μ; a nicked powder having an average diameter of 3μ and a copper powder having an average diameter of 50μ, respectively incorporated in the fluoride type flux at a ratio of 5 wt. %, (in the case of the iron powder, 1.0 wt. % was incorporated). The brazing metal was BAg-5(silver alloy) and the brazing was carried out at 800° C. for 1 min. and the spread areas (mm²) were compared.

FIG. 2 is a graph showing relation of spread areas and particle diameters of powdery metals incorporated in the flux.

As it is clearly understood from FIG. 2, the spread areas are increased depending upon decrease of the particle diameter for each powdery metal.

In FIG. 2, two kinds of iron powder having each average diameter of 100μ or 50μ; two kinds of cobalt powder having each average diameter of 135μ or 3μ; two kinds of nickel powder having each average diameter of 155μ or 3μ; and two kinds of copper powder having each average diameter of 100μ or 50μ were respectively incorporated in the fluoride type flux at a ratio of 5 wt. %. The brazing metal was BAg-5(silver alloy) and the brazing was carried out at 800° C. for 1 min. and the spread was (mm$^2$) were compared.

In accordance with the flux for silver brazing of the present invention, the powdery metal is incorporated in the flux especially the fluoride flux for silver brazing, whereby the brazing can be easily carried out on a difficulty brazable metal as a substrate by the heat of wetting caused by wetting the powdery metal with the molten metal, and the characteristic of the brazed part is advantageously excellent.

We claim:

1. A flux for brazing which consists essentially of a main component selected from the group consisting of boric acid, borax, alkali metal fluorides, alkali metal borofluorides and alkali metal chlorides; and 0.5 to 10 wt. % of a metal having an average particle diameter of 0.1 to 500μ, and water in an amount sufficient to form a paste.

2. The flux according to claim 1, wherein the powdery metal is selected from the group consisting of iron, cobalt, nickel and copper.

3. The flux according to claim 1, wherein the main component is present in a range of 30 to 95 wt. %.

4. The flux according to claim 1, wherein the main component is selected from the group consisting of $B_2O_3$, $Na_2B_2O_7$, NaF, KF, LiF, $NaBF_4$, $LiBF_4$, KCl, NaCl and LiCl.

5. The flux according to claim 1, wherein the main component is selected from the group consisting of alkali metal fluorides and alkali-metal borofluorides.

* * * * *